Sept. 10, 1968    M. A. PERLOW ET AL    3,401,064

ELECTRICAL POWER GENERATOR SYSTEM

Filed Feb. 6, 1967

INVENTORS.
MILTON A. PERLOW
JAMES H. VAN OSDOL
BY
Donald J. Ellingsberg

United States Patent Office 3,401,064
Patented Sept. 10, 1968

3,401,064
ELECTRICAL POWER GENERATOR SYSTEM
Milton A. Perlow, Woodland Hills, and James H. Van Osdol, Canoga Park, Calif., assignors to North American Rockwell Corporation, a corporation of Delaware
Filed Feb. 6, 1967, Ser. No. 614,103
10 Claims. (Cl. 136—202)

ABSTRACT OF THE DISCLOSURE

An electrical power generator system for the direct conversion of heat energy to electrical energy wherein substantially all the heat developed by a heat source passes through a direct energy converter because the converter is positioned in a well-defined heat flow path.

---

The invention relates to electrical power generator systems, and particularly to a power generator system using direct energy conversion of heat energy to electrical energy, and more particularly to a radioisotope-thermoelectric generator system.

Electrical power generator systems using direct energy conversion are known.[1] In these systems, a heat source such as a nuclear reactor or a radioisotope develops heat and a direct energy converter such as a thermoelectric converter or a thermionic converter converts the heat directly into electricity without intermediate rotating machinery. A heat flow or transfer path couples the converter to the heat source and to a heat sink. Clever placement not only of the heat source but also of thermal insulation about the heat source directs most of the heat developed by the heat source through the converter. Since loss of developed heat represents unrecoverable energy losses and reduces the efficiency of the power generator system, a well-defined heat flow path is necessary for a high performance generator.

When the heat source is a nuclear reactor or a radioisotope, remote handling tools are used to assemble some or all the components of a power generator system. Assembly of the components includes positioning the direct energy converter in a predetermined relationship to the heat source. When the direct energy converter is a module having thermoelectric assemblies, it is desirable to minimize or substantially eliminate stresses on the assemblies because thermoelectric materials have poor mechanical strength. If the system stresses on the elements are not minimized or substantially eliminated, the elements fracture and destroy electrical continuity.

Accordingly, it is an object of the invention to provide a new and improved electrical power generator system using direct energy conversion.

Another object is to provide a new and improved power generator system that positions a direct energy converter in a well-defined heat flow path.

A further object of the invention is to provide a new and improved power generator system that insures proper positioning of the heat source in relationship to the direct energy converter.

Briefly, a new and improved electrical power generator system is provided for the direct energy conversion of heat energy to electrical energy. The system includes a hermetically sealed inner container positioned within a hermetically sealed outer container and thermally connected to the outer container. A heat source and a direct energy converter are positioned within the inner container with the heat source and the direct energy converter maintained in a spaced-apart relationship by a spacer member. The heat source is thermally insulated from the inner container while the direct energy converter is thermally connected to the inner container so that substantially all the heat energy developed by the heat source passes through the direct energy converter for the efficient conversion of heat energy to electrical energy.

Further objects, features, and the attending advantages of the invention will be apparent when the following description is read in connection with the accompanying drawing in which.

Figure 1:
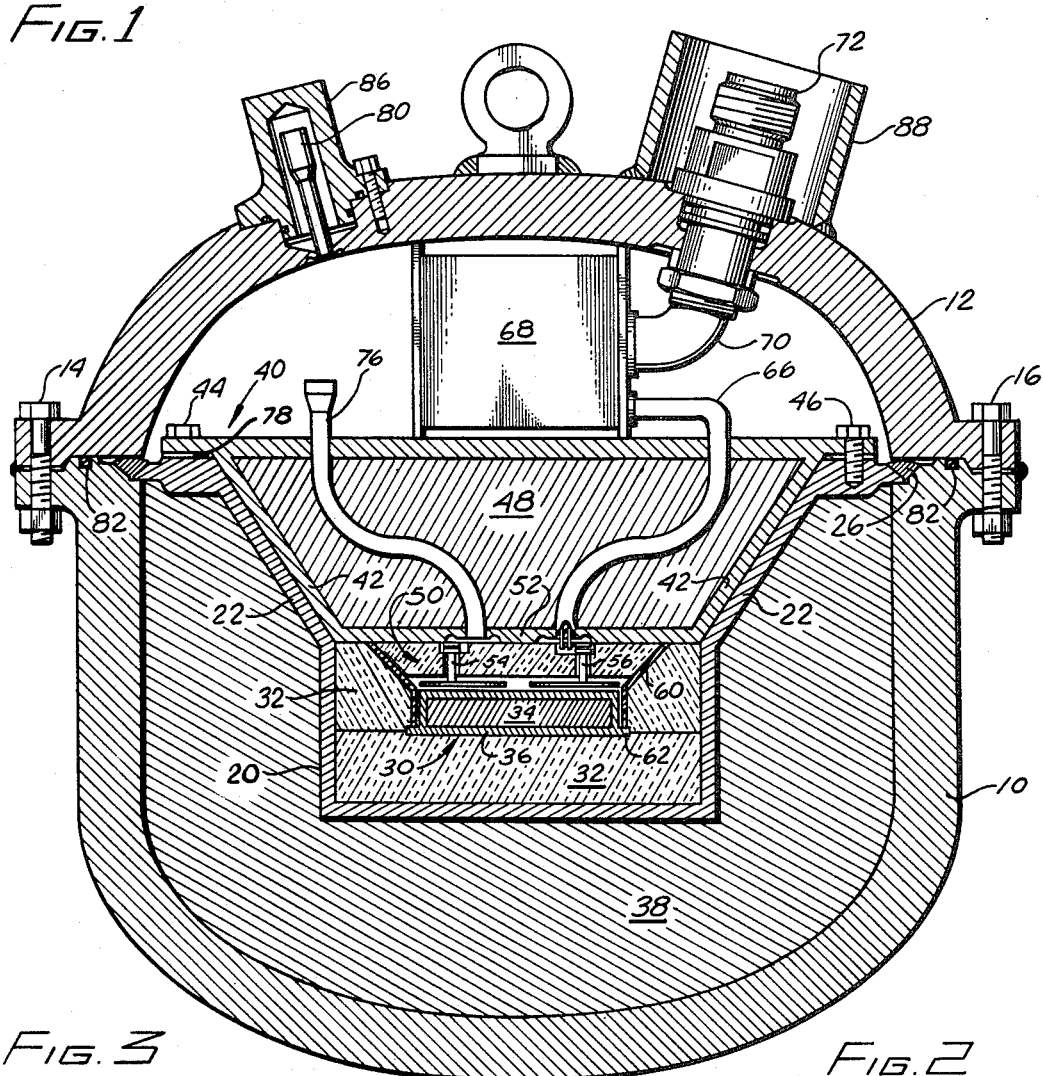
FIGURE 1 is an elevation, partly sectional, of one form of power generator system formed in accordance with the invention.

Referring to FIGURE 1, one form of electrical power generator system of the invention has an outer receptacle 10 and a cover 12 that is removably secured to the outer receptacle by a plurality of spaced bolts or the like, such as bolts 14 and 16. The outer receptacle 10 and cover 12 when assembled as shown form an outer container shell or means. An inner receptacle 20 is positioned within the outer receptacle 10. The inner receptacle 20 has a flared portion 22 that is suitably connected to the outer receptacle 10, such as by weld 26.

A heat source 30 is positioned within the inner receptacle 20 and spaced from the inner receptacle by thermal insulation 32 such as glass wool or the like. The heat source 30 in the power generator system of FIGURE 1 is a radioisotope 34, such as strontium titanate ($Sr^{90}$-$TiO_3$), that is encapsulated or contained in a heat source shell 36 that is formed from an alloy such as Hastelloy C. Additional layers (not shown) formed from the same or similar alloys can be positioned about heat source shell 36 in a conventional manner. The volume between the outer receptacle 10 and the inner receptacle 20 is filled with a suitable biological shielding material 38 such as lead, tungsten, depleted uranium, or the like.

A shield plug 40 has a tapered portion 42 that generally cooperates with the flared portion 22 of the inner receptacle 20. The mating surfaces of the tapered portion 42 of plug 40 and the flared portion 22 of inner receptacle 20 are preferably an interference fit and have a right cone geometry with the tapered portion 42 shaped as a frustum. The geometries of the mating surfaces as illustrated facilitate assembly of the power generator system, provide a reliable heat transfer path, and enable the inner container to withstand higher external pressures and imposed stresses. The shield plug 40 is removably secured to the flared portion 22 of the inner receptacle 20 by a plurality of spaced cap screws or the like, such as screws 44 and 46. The inner receptacle 20 and shield plug 40 when assembled as shown form an inner container shell or means. The shield plug 40 is also filled as shown by FIGURE 1 with a biological shield material 48 that can be the same as the biological shielding material 38 described above.

A direct energy converter 50 is suitably connected to the base portion 52 of the shield plug 40 and removable therewith. The energy converter 50 in the power generator system of FIGURE 1 is a thermoelectric converter with a plurality of similar thermoelectric assemblies such as thermoelectric assemblies 54 and 56. It is contemplated that the direct energy converter 50 can also be a thermionic converter, or some other suitable form of direct energy converter. A thermally conductive, electrical insulator, e.g., BeO metallized with Mo and Ni plated on both sides (not shown), is a part of each thermoelectric

[1] Power from Radioisotopes, Series on Understanding the Atom, U.S. Atomic Energy Commission (1964).

assembly, such as thermoelectric assemblies 54 and 56, and is bonded in a conventional manner to the base portion 52 of the shield plug 40.

Figure 3:
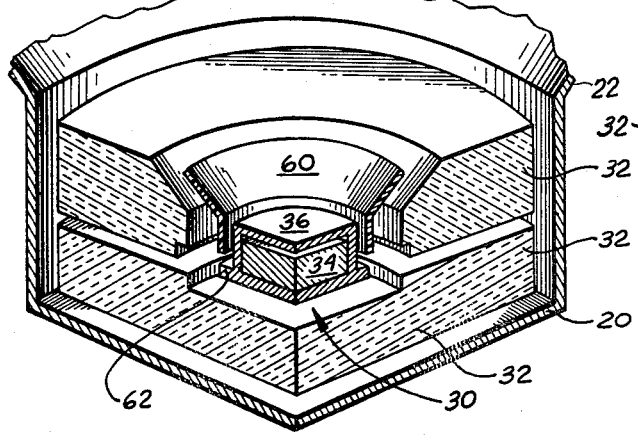
FIGURE 3 is an exploded isometric section of a portion of the power generator system of FIGURE 1.
Figure 2:
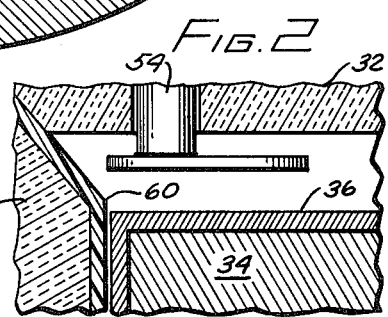
FIGURE 2 is an enlarged section, partly broken away, of a portion of the power generator system of FIGURE 1.

The direct energy converter 50 is spaced from the heat source 30 when the shield plug 40 and inner receptacle 20 are assembled as shown by FIGURE 1. In the orientation as shown, the heat source 30 does not impose any mechanical stresses upon the direct energy converter 50, i.e., the thermoelectric assemblies 54 and 56. A spacer means, such as the generally funnel-shaped spacer member 60 as shown by FIGURES 1 and 3, bears against the base portion 52 of the shield plug 40 and against a suitable flange portion 62 of the heat source shell 36. The spacer member 60 maintains the heat source 30 and direct energy converter 50 in the desired spaced-apart relationship as particularly shown by FIGURE 2 regardless of the physical orientation of the power generator system. The spacer member 60 is preferably formed from a thermally and electrically insulating material such as mica or the like.

Referring again to FIGURE 1, a well-defined heat flow or transfer path is developed by the assembled component which have been described above. Substantially all of the heat energy developed by the heat source 30 passes primarily by radiative coupling to the hot region or hot junctions of the thermoelectric assemblies 54 and 56 of the direct energy converter 50 because the thermal insulation 32 minimizes heat loss to the inner receptacle 20. The heat energy passes through the thermoelectric assemblies 54 and 56 to the cold region or cold junctions that are thermally connected to but electrically insulated from the base portion 52 of the shield plug 40. The heat passes by conduction through the base portion 52 to the tapered portion 42, and by conduction through the biological shielding material 48. The heat flow or transfer path is further defined by the mated tapered portion 42 of the shield plug 40 and the flared portion 22 of the inner receptacle 20. The heat energy passes through the tapered portion 42 and the flared portion 22, and through the physical connection, e.g., weld 26, to the outer receptacle 10. The heat energy also passes from the flared portion 22 through the biological shielding material 38 to the outer receptacle 10. Thus, the flared portion 22 defines a heat transfer path thermally connected to the outer receptacle by the physical connection, e.g., weld 26, and by the biological shielding material 38. The base portion 52, tapered portion 42, and biological shielding material 48 define a second heat transfer path that is thermally connected to the heat transfer path defined in part by the flared portion. The heat energy that is passed to the outer receptacle 10 by conduction and convection from the inner container is rejected to the environment in which the power generator system finds use. For example, in deep submergence operation, the heat would be rejected to the surrounding water; in terrestrial operation, the heat would be rejected to the surrounding air. Heat rejection is maximized with the well-defined heat flow or transfer path as described and illustrated, and the heat flow path is enhanced by the thermal insulation 32 that minimizes heat losses from the heat source 30 directly to the inner receptacle 20 without first passing through the direct energy converter 50. Thus, substantially all the heat energy developed by the heat source 30 passes through the direct energy converter 50.

Electrical power is generated by the thermoelectric assemblies 54 and 56 of the direct energy converter 50 because of the temperature difference developed across the thermoelectric assemblies between the hot and cold junctions, as is well known in the art. The electrical power is fed from the direct energy converter 50 through electrical power lead 66 to suitable and conventional power conditioning equipment 68 positioned within the outer container, i.e., the outer receptacle 10 and cover 12 as shown by FIGURE 1. The electrical power is fed from the power conditioning equipment 68 through lead 70 to a conventional bulkhead electrical connector 72 where the electrical power is available for an external electrical load (not shown). It is contemplated that the power conditioning equipment can be positioned at an external location rather than within the power generator system as illustrated. It is also contemplated that the power conditioning equipment 68 can be eliminated where direct power connection to the external load is required.

The inner container, i.e., the inner receptacle 20 and the assembled shield plug 40 in the form of power generator system as shown by FIGURE 1, is evacuated through pipe 76, preferably backfilled with an inert atmosphere such as argon or the like, and hermetically sealed by crimping or otherwise closing pipe 76; shield plug gasket 78 completes the hermetic seal. The outer container, i.e., the outer receptacle 10 and cover 12, is evacuated through pipe 80, preferably backfilled with an inert atmosphere, and hermetically sealed by crimping or otherwise closing pipe 80; an O-ring 82 between the cover and outer receptacle completes the hermetic seal. A protective cap 86 is provided for the outwardly extending pipe 80 to insure system integrity. A similar protective cylinder 88 is provided for the electrical connector 72. Pipe 76 and electrical lead 66 preferably have a non-rectilinear geometry such as the general S-curves as shown by FIGURE 1 so that, when the heat source 30 is a radioisotope, any stray radiation can not pass through the biological shielding 48 in a straight line.

As an illustrative example, one electrical power generator system similar to that as shown and described has the following system characteristics:

| | |
|---|---|
| Radioisotope fuel | $SrTiO_3$. |
| Fuel encapsulant | Hastelloy-C. |
| Thermal insulation | Min. K-2000. |
| Biological shield | Lead. |
| Spacer | Mica. |
| Outer containment vessel | HY80 Steel. |
| Power (watts) | 1.0. |
| Voltage (volts) | 24 ±1. |
| Operating life (years) | 10. |
| Thermal power (watts | |
| Beginning-of-life | 83. |
| End-of-life | 65. |
| System efficiency, (percent) | |
| Beginning-of-life | 1.2. |
| End-of-life | 1.5. |
| Dose rate @ 1 ft. (m-rems/hr.) | 5.0. |
| Approximate size (inches) | 17 in. long x 19½ in. diameter for cylindrical configuration as illustrated. |
| Approximate weight (pounds) | 1530. |

As will be evidenced from the foregoing description, certain aspects of the invention are not limited to the particular details of construction as illustrated, and it is contemplated that other modifications and applications will occur to those skilled in the art. It is, therefore, intended that the claims shall cover such modifications and applications that do not depart from the true spirit and scope of the invention.

We claim:

1. An electrical power generator system for the direct energy conversion of heat energy to electrical energy comprising:
   (a) hermetically sealed outer container means,
   (b) hermetically sealed inner container means positioned within said outer container means,
   (c) shielding means generally positioned between said outer and inner container means and thermally connected therebetween,
   (d) said inner container means and said shielding means defining a heat flow path thermally connected to said outer container means, (e) heat source means positioned within said inner container means, (f) insulation means thermally insulating predetermined portions of said heat flow path from said heat source means, (g) direct energy converter means for converting heat energy to electrical energy and having hot and cold regions, said cold regions thermally connected to and electrically insulated from said heat flow path, and (h) spacer means cooperating with said inner container means and said heat source means maintaining said heat source means and said converter means in a spaced-apart relationship so that said hot regions are spaced from said heat source means.

2. The electrical power generator system of claim 1 in which said outer container means includes:
(a) first receptacle means, and
(b) cover means cooperating with said first receptacle means;
and said inner container means includes:
(a) second receptacle means, and
(b) plug means cooperating with said second receptacle means.

3. The electrical power generator system of claim 2 in which said second receptacle means is thermally connected to said outer container means and said plug means is thermally connected to said second receptacle means and to said outer container means.

4. The electrical power generator system of claim 2 in which said direct energy converter means is a thermoelectric converter means.

5. The electrical power generator system of claim 4 in which said thermoelectric converter means is thermally connected to and electrically insulated from said plug means.

6. The electrical power generator system of claim 2 in which said second receptacle means has a generally flared portion that cooperates with and receives in a mating physical and thermal engagement a generally tapered portion of said plug means.

7. The electrical power generator system of claim 1 in which said heat source means is a radioisotope.

8. The electrical power generator system of claim 1 in which said spacer means is thermally insulating.

9. The electrical power generator system of claim 1 in which said direct energy converter means includes a power conditioning means positioned within said outer container means and electrically connected to said direct energy converter means.

10. The electrical power generator system of claim 1 in which said outer and inner container means have an inert atmosphere.

References Cited
UNITED STATES PATENTS
3,347,711  10/1967  Banks et al. _____ 136—202

REUBEN EPSTEIN, *Primary Examiner.*